United States Patent
Heo et al.

(10) Patent No.: US 9,998,762 B2
(45) Date of Patent: Jun. 12, 2018

(54) METHOD AND APPARATUS FOR PROCESSING VIDEO SIGNALS

(71) Applicant: LG ELECTRONICS INC., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 14/759,611

(22) PCT Filed: Jan. 9, 2014

(86) PCT No.: PCT/KR2014/000235
§ 371 (c)(1),
(2) Date: Jul. 7, 2015

(87) PCT Pub. No.: WO2014/109563
PCT Pub. Date: Jul. 17, 2014

(65) Prior Publication Data
US 2015/0350679 A1 Dec. 3, 2015

Related U.S. Application Data

(60) Provisional application No. 61/750,798, filed on Jan. 9, 2013.

(51) Int. Cl.
*H04N 19/597* (2014.01)
*H04N 13/00* (2018.01)
(Continued)

(52) U.S. Cl.
CPC ....... *H04N 19/597* (2014.11); *H04N 13/0003* (2013.01); *H04N 19/463* (2014.11);
(Continued)

(58) Field of Classification Search
CPC .... H04N 19/597; H04N 19/176; H04N 19/70; H04N 19/105; H04N 19/172;
(Continued)

(56) References Cited

U.S. PATENT DOCUMENTS

2012/0314027 A1  12/2012  Tian et al.
2014/0092208 A1*  4/2014  Zou ..................... H04N 19/597
                                                    348/43

FOREIGN PATENT DOCUMENTS

CN  101617537 A  12/2009
CN  101641954 A  2/2010
(Continued)

OTHER PUBLICATIONS

Sung et al. ("3D-CE5.h related: Inter-view prediction using image deformation characteristics between multi-view images", 103. MPEG Meeting; Jan. 21, 2013-Jan. 25, 2013; Geneva; (Motion Picture Expert Group or ISO/I EC JTC1/SC29/WG11), No. m27859, Jan. 18, 2013 (Jan. 18, 2013), XP030056412 EPO Form 1703 01.91TRI).*

(Continued)

*Primary Examiner* — Dave Czekaj
*Assistant Examiner* — Berteau Joisil
(74) *Attorney, Agent, or Firm* — Dentons US LLP

(57) ABSTRACT

The present invention relates to a method and an apparatus for processing video signals, and more specifically, to a method and an apparatus for processing video signals which applies deformation compensation to decode a current texture block. The present invention can increase the accuracy of an inter-prediction by obtaining the position of a block within a reference picture referenced by the current texture (Continued)

block, by means of using deformation compensation parameter information, and obtaining a pixel value of the block within the reference picture that is obtained from a prediction value of the current texture block.

4 Claims, 12 Drawing Sheets

(51) Int. Cl.
*H04N 19/70* (2014.01)
*H04N 19/463* (2014.01)
*H04N 19/59* (2014.01)
*H04N 19/61* (2014.01)

(52) U.S. Cl.
CPC ............. *H04N 19/70* (2014.11); *H04N 19/59* (2014.11); *H04N 19/61* (2014.11)

(58) Field of Classification Search
CPC .... H04N 19/463; H04N 19/008; H04N 19/59; H04N 19/61; H04N 13/00
See application file for complete search history.

(56) References Cited

FOREIGN PATENT DOCUMENTS

| JP | 2008271217 A | 11/2008 |
|---|---|---|
| KR | 1020090006093 A | 1/2009 |
| KR | 1020110093792 A | 8/2011 |
| KR | 1020110102305 A | 9/2011 |
| KR | 1020120000485 A | 1/2012 |

OTHER PUBLICATIONS

Ka-Man Wong et al: "Horizontal Scaling and Shearing-Based Disparity-Compensated Prediction for Stereo Video Coding",IEEE Transactions on Circuits and Systems for Video Technology, vol. 22, No. 10, Oct. 1, 2012, pp. 1457-1470, XP011466094.

Hui Lv et al: "Side Information Generation With Constrained Relaxation for Distributed Multi-View Video Coding", IEEE Circuits and Systems, May 18, 2008, pp. 3450-3453, XP031392756.

Sung J et al., "3D-CE5.h related: Inter-view prediction using image deformation characteristics between multi-view images", Joint Collaborative Team on 3D Video Coding Extension Development of ITU-T SG 16 WP 3 and ISO/IEC JTC 1/SC 29/WG 11, Document: JCT3V-00118r1, Jan. 17-23, 2013, XP030056412.

Search Report of European Patent Office in Application No. 14738108.1, dated Jul. 19, 2016.

"Horizontal Scaling and Shearing-Based Disparity-Compensated Prediction for Stereo Video Coding", IEEE Transactions on Circuits and Systems for Video Technology, vol. 22, No. 10, Oct. 31, 2012.

\* cited by examiner

FIG. 3
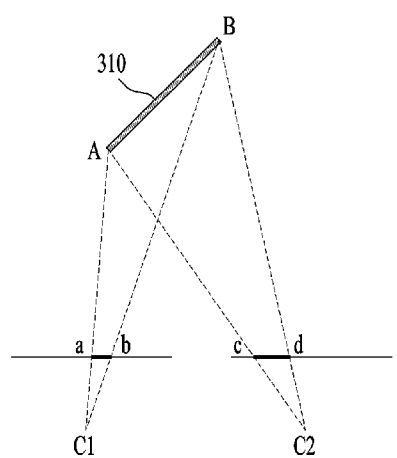
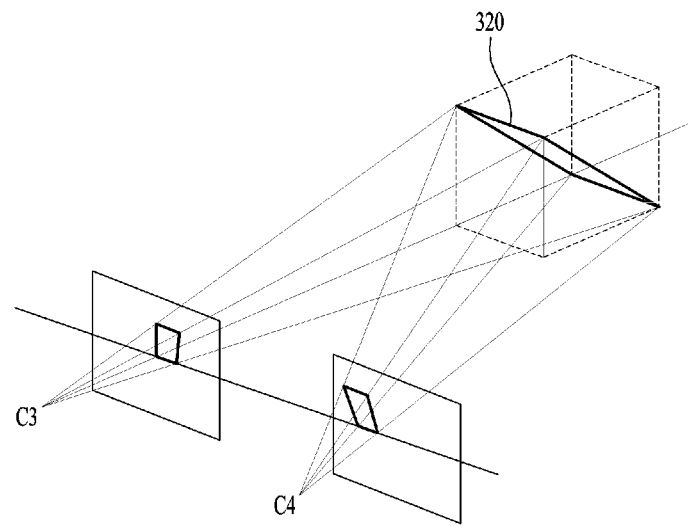

FIG. 7

| slice_header { |
| --- |
| deform_type |
| deform_scale |
| } |

FIG. 8

| sps { |
| --- |
| deform_max_depth |
| } |

FIG. 9

```
prediction_unit( x0, y0, nPbW, nPbH ) {
  if( skip_flag[ x0 ][ y0 ] ) {
    ...
  } else { /* MODE_INTER */
    merge_flag[ x0 ][ y0 ]
    if( merge_flag[ x0 ][ y0 ] ) {
      ..
    } else {
      if( slice_type == B )
        inter_pred_idc[ x0 ][ y0 ]
      if( inter_pred_idc[ x0 ][ y0 ] != Pred_L1 ) {
        if( num_ref_idx_l0_active_minus1 > 0 )
          ref_idx_l0[ x0 ][ y0 ]
        mvd_coding( x0, y0, 0 )
        mvp_l0_idx[ x0 ][ y0 ]
        if( curPOC == POC( ref_idx_l0 ) && slice_type==P ) {
          deform_param_idx
        }
      }
      if( inter_pred_idc[ x0 ][ y0 ] != Pred_L0 ) {
        if( num_ref_idx_l1_active_minus1 > 0 )
          ref_idx_l1[ x0 ][ y0 ]
        if( mvd_l1_zero_flag &&
            inter_pred_idc[ x0 ][ y0 ] == Pred_BI) {
          MvdL1[ x0 ][ y0 ][ 0 ] = 0
          MvdL1[ x0 ][ y0 ][ 1 ] = 0
        } else
          mvd_coding( x0, y0, 1 )
        mvp_l1_idx[ x0 ][ y0 ]
      }
    }
  }
}
```

FIG. 11

```
prediction_unit( x0, y0, nPbW, nPbH ) {
  if( skip_flag[ x0 ][ y0 ] ) {
    ...
  } else { /* MODE_INTER */
    merge_flag[ x0 ][ y0 ]
    if( merge_flag[ x0 ][ y0 ] ) {
      ..
    } else {
      if( slice_type == B )
        inter_pred_idc[ x0 ][ y0 ]
      if( inter_pred_idc[ x0 ][ y0 ] != Pred_L1 ) {
        if( num_ref_idx_l0_active_minus1 > 0 )
          ref_idx_l0[ x0 ][ y0 ]
        mvd_coding( x0, y0, 0 )
        mvp_l0_idx[ x0 ][ y0 ]
        if( curPOC == POC( ref_idx_l0 ) && slice_type==P ) {
          deform_merge_left_flag
          if( deform_merge_left_flag==0 )
            deform_merge_up_flag
          if( deform_merge_up_flag==0 )
            deform_param_idx2
        }
      }
      if( inter_pred_idc[ x0 ][ y0 ] != Pred_L0 ) {
        if( num_ref_idx_l1_active_minus1 > 0 )
          ref_idx_l1[ x0 ][ y0 ]
        if( mvd_l1_zero_flag &&
            inter_pred_idc[ x0 ][ y0 ] == Pred_BI) {
          MvdL1[ x0 ][ y0 ][ 0 ] = 0
          MvdL1[ x0 ][ y0 ][ 1 ] = 0
        } else
          mvd_coding( x0, y0, 1 )
        mvp_l1_idx[ x0 ][ y0 ]
      }
    }
  }
}
```

FIG. 13

| |
|---|
| prediction_unit( x0, y0, nPbW, nPbH ) { |
|   if( skip_flag[ x0 ][ y0 ] ) { |
|     ... |
|   } else { /* MODE_INTER */ |
|     merge_flag[ x0 ][ y0 ] |
|     if( merge_flag[ x0 ][ y0 ] ) { |
|       .. |
|     } else { |
|       if( slice_type == B ) |
|         inter_pred_idc[ x0 ][ y0 ] |
|       if( inter_pred_idc[ x0 ][ y0 ] != Pred_L1 ) { |
|         if( num_ref_idx_l0_active_minus1 > 0 ) |
|           ref_idx_l0[ x0 ][ y0 ] |
|         mvd_coding( x0, y0, 0 ) |
|         mvp_l0_idx[ x0 ][ y0 ] |
|         if( curPOC == POC( ref_idx_l0 ) && slice_type==P ) { |
|         use_predicted_deform_param_flag |
|         if( use_predicted_deform_param_flag==0 ) |
|           deform_param_idx2 |
|         } |
|       } |
|       if( inter_pred_idc[ x0 ][ y0 ] != Pred_L0 ) { |
|         if( num_ref_idx_l1_active_minus1 > 0 ) |
|           ref_idx_l1[ x0 ][ y0 ] |
|         if( mvd_l1_zero_flag && |
|           inter_pred_idc[ x0 ][ y0 ] == Pred_BI) { |
|           MvdL1[ x0 ][ y0 ][ 0 ] = 0 |
|           MvdL1[ x0 ][ y0 ][ 1 ] = 0 |
|         } else |
|           mvd_coding( x0, y0, 1 ) |
|         mvp_l1_idx[ x0 ][ y0 ] |
|       } |
|     } |
|   } |
| } |

METHOD AND APPARATUS FOR PROCESSING VIDEO SIGNALS

This application is a National Phase Application of International Application No. PCT/KR2014/000235, filed on Jan. 9, 2014, which claims the benefit of U.S. Provisional Application No. 61/750,798, filed Jan. 9, 2013, which are hereby incorporated by reference in their entirety for all purposes as if fully set forth herein.

TECHNICAL FIELD

The present invention relates to a method and an apparatus for processing video signals.

BACKGROUND ART

Compression refers to a signal processing technique for transmitting digital information through a communication line or storing the digital information in a form suitable for a storage medium. Compression targets include audio, video and text. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention applies deformation compensation to decoding of a current texture block using a reference picture of a different view.

In addition, the present invention acquires deformation compensation parameter index information of the current texture block using deformation compensation parameter index information of a neighboring block.

Advantageous Effects

The present invention can acquire an accurate reference picture by deformation compensation of a view difference due to camera positions and improve decoding accuracy.

In addition, the present invention can reduce decoding complexity by acquiring deformation compensation parameter index information of the current texture block by using deformation compensation parameter index information of a neighboring block.

BRIEF DESCRIPTION OF DRAWINGS

FIG. 3 illustrates an example of taking pictures of an object in different lengths and shapes depending on camera positions according to an embodiment to which the present invention is applied.

FIG. 7 illustrates an example of acquiring deformation compensation application information and deformation compensation scale information according to an embodiment to which the present invention is applied.

FIG. 8 illustrates an example of acquiring deformation compensation block information according to an embodiment to which the present invention is applied.

FIG. 9 illustrates an example of acquiring deformation compensation parameter index information according to an embodiment to which the present invention is applied.

FIG. 11 illustrates an example of acquiring a deformation compensation merge left flag and a deformation compensation merge upper flag according to an embodiment to which the present invention is applied.

FIG. 13 illustrates an example of acquiring deformation compensation reuse information according to an embodiment to which the present invention is applied.

BEST MODE

The present invention provides a video decoder, including an inter-prediction unit configured to decode at least one of a reference view texture picture, a reference view depth picture and a current view depth picture, to acquire deformation compensation parameter information of a current texture block, to acquire a block within a reference picture, corresponding to the current texture block, using the deformation compensation parameter, and to acquire prediction values of the current texture block using pixel values of the block within the reference picture and the deformation compensation parameter information, and a signal processing method.

The inter-prediction unit may acquire a depth block corresponding to the current texture block, acquire an inter-view motion vector using a depth value of the depth block and acquire the deformation compensation parameter information using the inter-view motion vector.

The deformation compensation parameter information may be acquired using deformation compensation scale information and deformation compensation parameter index information.

The deformation compensation parameter index information may be acquired using a deformation compensation merge left flag or a deformation compensation merge upper flag.

The deformation compensation parameter index information may be acquired using deformation compensation reuse information.

The deformation compensation parameter information may be acquired using deformation compensation application information.

The inter-prediction unit may acquire deformation compensation block information and determine whether deformation compensation is applied to the current texture block using the deformation compensation block information.

MODES FOR INVENTION

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
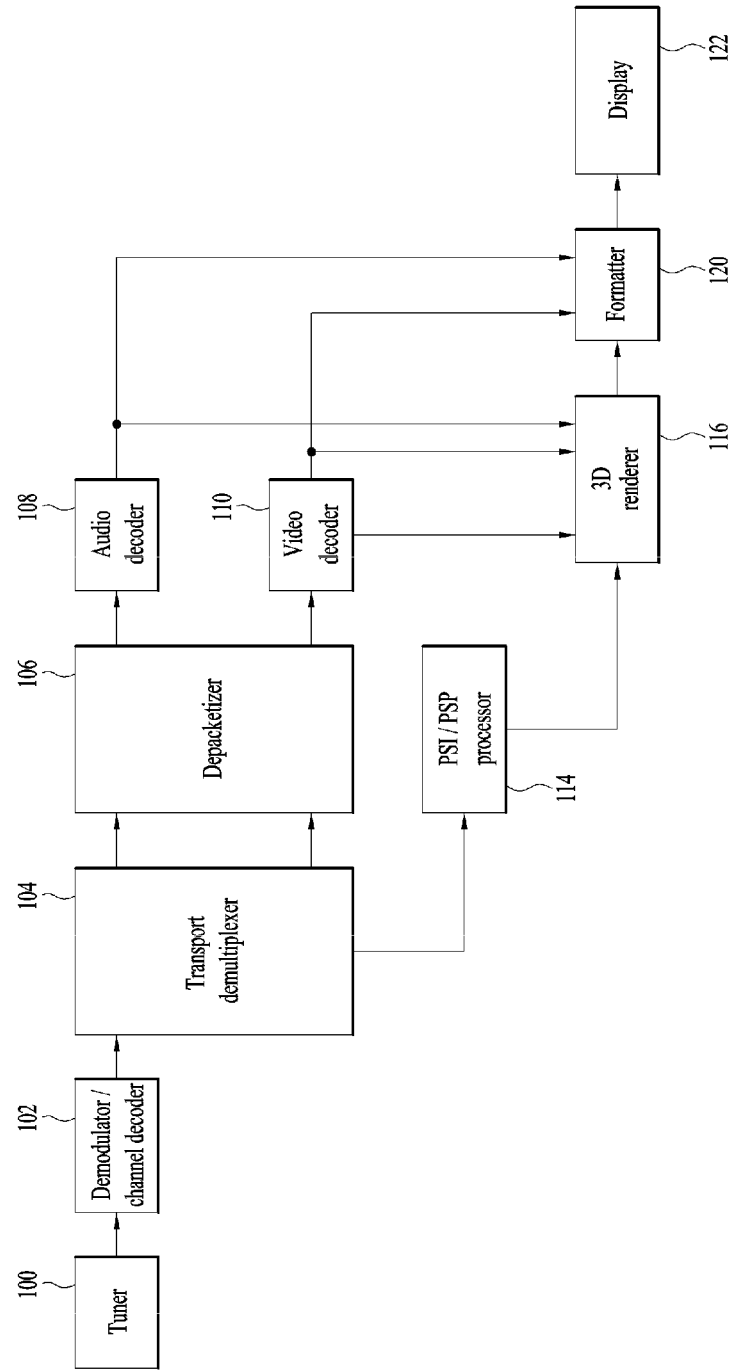
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned to by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating occlusion by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an example and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
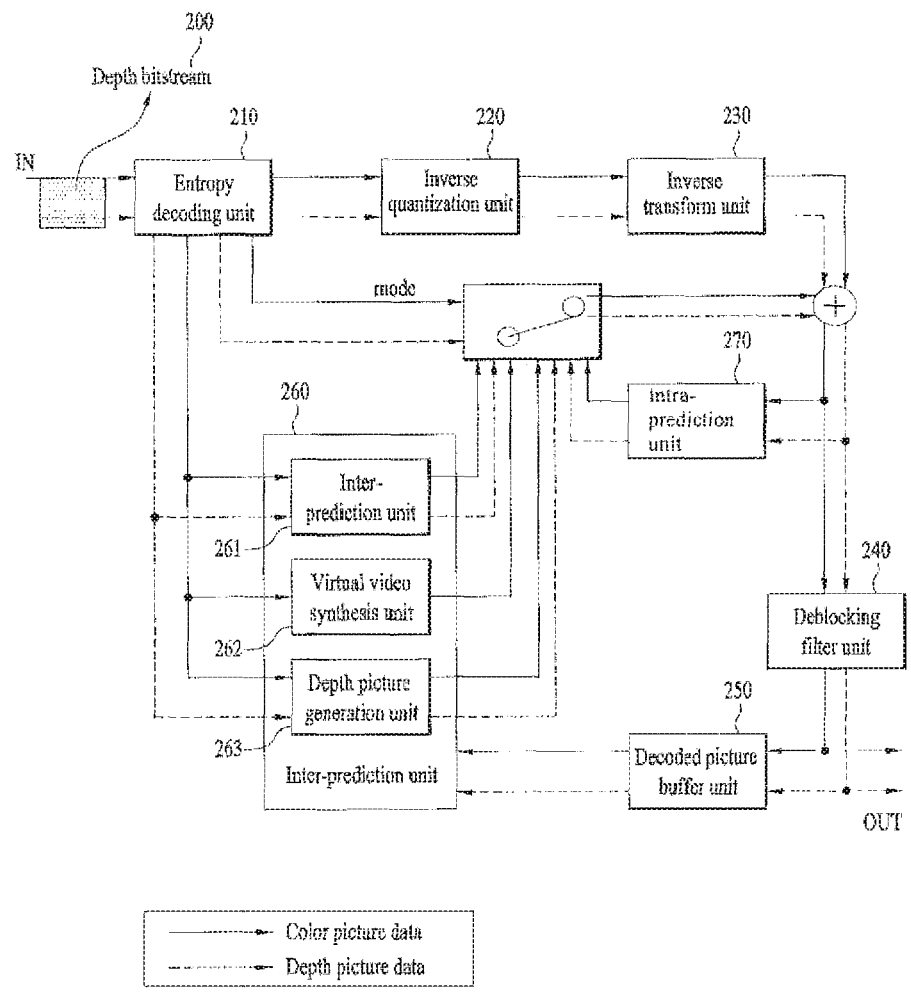
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, a deblocking filter unit 240, a decoded picture buffer unit 250, an inter-prediction unit 260 and an intra-prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of a depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra-prediction unit 270 performs intra-prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter-prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate inter-view dependence of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter-prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter-prediction unit 260.

Referring to FIG. 2, the inter-prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture order count information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter-prediction using neighboring depth pictures of the current depth picture can be performed and intra-prediction using decoded depth information in the current depth picture can be performed.

A description will be given of an example in which an object is seen as objects having different lengths and shapes depending on camera positions when a multiview image is photographed with reference to FIG. 3.

FIG. 3 illustrates an example of taking pictures of an object in different lengths and shapes depending on camera positions according to an embodiment of the present invention.

In photographing of a multiview image, when cameras are located at different positions and an object is simultaneously photographed by the cameras, as shown in FIG. 3, the object can be photographed differently according to the positions of the cameras. For example, when a first object 310, which is disposed obliquely with respect to a line in which cameras C1 and C2 are positioned, is photographed using the cameras C1 and C2, as shown in FIG. 3(a), the first object 310 having a length AB is photographed by camera C1 as an image having a length ab less than AB and photographed by C2 as an image having a length cd less than AB and different from ab. That is, the first object 310 may be photographed in different lengths according to camera positions. An another example, a second object 320 in a square, which is disposed obliquely with respect to a line in which cameras C3 and C4 are positioned, may be photographed, as shown in FIG. 3(b). In this case, the second object 320 can be photographed as a diamond-shaped image through the camera C3. In addition, the second object 320 can be photographed as a parallelogram image through the camera C4. That is, the second object can be photographed in different shapes according to camera positions.

As shown in FIGS. 3(a) and 3(b), an object may be seen as objects in different lengths or shapes according to camera positions and thus a length difference or warping may be generated. Such length difference or warping deteriorates decoding accuracy of multiview images. That is, when an image captured through the cameras C1 and C3 is an image of a reference view V0 and an image captured through the cameras C2 and C4 is an image of a current view V1, it is difficult to acquire an accurate reference block of a current block due to a length difference or warping when the image of the current view is decoded using the image of the reference view, deteriorating decoding accuracy.

Accordingly, the present invention provides a method for acquiring prediction values of a current texture block by using a reference picture which is generated using a deformation compensation parameter as a deformation compensation method for compensating for a length difference and warping according to camera positions in order to improve accuracy of multiview images. The deformation compensation method can be used in view synthesis prediction and disparity compensation prediction.

A description will be given of a deformation compensation method in view synthesis prediction and then a deformation compensation method in disparity compensation prediction. Here, view synthesis prediction (VSP) is a method that synthesizes a virtual reference picture of the same view as a current view by using a texture picture of a reference view and a depth picture of the reference view or the current view and uses the virtual reference picture as prediction values of the current texture block. A description will be given of the deformation compensation method in such view synthesis prediction with reference to FIG. 4.

Figure 4:
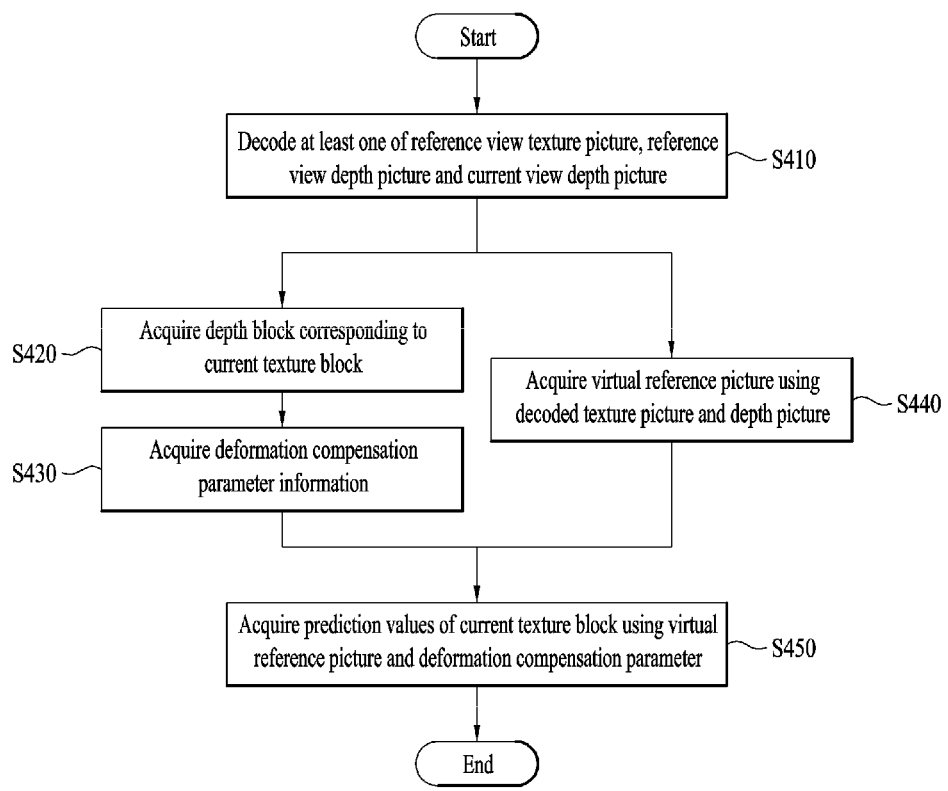
FIG. 4 is a flowchart illustrating an example of decoding a current texture picture using a deformation compensation method in view synthesis prediction according to an embodiment to which the present invention is applied.

FIG. 4 is a flowchart illustrating an example of decoding the current texture block using the deformation compensation method in view synthesis prediction according to an embodiment of the present invention.

At least one of a reference view texture picture, a reference view depth picture and a current view depth picture may be decoded (S410). The reference view texture picture may be decoded prior to the current view texture picture. Here, a decoded depth block may include one of a depth block of the reference view and a depth block of the current view. The reference view texture picture may be decoded through intra-prediction or inter-prediction and may be decoded without using a texture picture of a different view as a reference picture.

A depth block corresponding to the current texture block may be acquired (S420). Here, the depth block corresponding to the current texture block may be a depth block at the same position as a current texture picture within a depth picture corresponding to the same view as a current picture and having the same POC as the current picture. Alternatively, the depth block corresponding to the current texture block may be a depth block disposed at a position considering an inter-view motion vector within a depth picture corresponding to a view different from the current picture and having the same POC as the current picture. For example, when the left upper point of the current texture picture is (px, py) and the inter-view motion vector is (dvx, dvy), the left upper point of the depth block corresponding to the current texture block at the reference view can be (px+dvx, pu+dvy). Alternatively, the y value of the inter-view motion vector may be ignored and (px+dvx, py) may be determined as the left upper point of the depth block corresponding to the current texture block.

Deformation compensation parameter information of the current texture block may be acquired (S430). The deformation compensation parameter information is a parameter for compensating for a length difference and warping according to camera positions and may include a length difference deformation compensation parameter and a warping deformation compensation parameter and be acquired using a depth value of the depth block corresponding to the current texture block. The deformation compensation parameter information can be acquired per block in the current texture picture by using the depth value of the depth block corresponding to the current texture block, determined in S420.

A description will be given of a method for acquiring the deformation compensation parameter information.

1) Acquisition of Deformation Compensation Parameter Information Using all Pixels in a Block All pixels in the current texture block may be searched for the depth block corresponding to the current texture block, as described above, and an inter-view motion vector may be calculated from depth pixel values in the depth block. Then, reference view pixel coordinates corresponding to each pixel of the current texture block may be acquired by using the inter-view motion vector. Deformation compensation parameter information that minimizes the error represented by Equation 1 may be acquired using least squares estimation (LSE).

$$E(\alpha, \beta, d_x) = \sum_{i=1}^{N^2} (\alpha x_i + \beta y_i + c_x + d_x - x'_i)^2 \quad \text{[Equation 1]}$$

2) Acquisition of Deformation Compensation Parameter Information Using Part of Pixels in a Block The deformation compensation parameter information may be acquired through LSE using only part of pixels in the current texture block. Part of the pixels may be a left upper pixel 510, a right upper pixel 520, a left lower pixel 530 and a right lower pixel 540 in the current texture block, as shown in FIG. 5(a). Alternatively, part of the pixels may be a plurality of pixels 520 to 535 at predetermined intervals in the current texture block, as shown in FIG. 5(b).

3) Acquisition of Deformation Compensation Parameter Information Through Simple Calculation According to this method, dx to be applied to the current texture block is determined from a depth value corresponding to the center pixel of the current texture block. In addition, a pixel position in a reference view picture, which corresponds to the center pixel of the current texture block, is determined as (0, 0) and coordinates of pixels corresponding to four corners of the current texture picture are calculated. The length difference deformation compensation parameter a can be determined as the mean of ratios of the length of the upper side of the current texture picture to the length of the lower side, and the warping deformation compensation parameter β can be determined as the gradient of a line that connects two pixels respectively corresponding to the center of the upper side and the center of the lower side.

A virtual reference picture may be acquired by merging the reference view texture picture and depth picture (S440). The virtual reference picture is a virtual picture used for view synthesis prediction of the current texture block within the current texture picture. The virtual reference picture can be acquired by merging a texture picture and a depth picture. That is, the virtual reference picture can be acquired by generating an inter-view motion vector using depth values in the depth picture, which correspond to pixels in the virtual reference picture, and moving pixels of the texture picture by the inter-view motion vector. The virtual reference picture may be synthesized prior to decoding of the current texture block or synthesized during a decoding process. For example, the virtual reference picture can be acquired only when the current texture block is a block decoded using view synthesis prediction. An example of acquiring the virtual reference picture will be described in detail later with reference to FIG. 5.

Prediction values of the current texture block may be acquired using the virtual reference picture and the deformation compensation parameter information (S450). The position of a block within the virtual reference picture, which corresponds to the current texture block, may be acquired and pixel values of the block within the virtual reference picture, which correspond to the acquired position, may be obtained as the prediction values of the current texture block. The position of the block within the virtual reference picture, which corresponds to the current texture block, may be acquired using the deformation compensation parameter information through Equation 2.

$$\begin{pmatrix} x' \\ y' \end{pmatrix} = \begin{bmatrix} \alpha & \beta \\ 0 & 1 \end{bmatrix} \begin{pmatrix} x \\ y \end{pmatrix} + \begin{pmatrix} c_x + d_X \\ c_y + d_y \end{pmatrix} = \begin{pmatrix} \alpha x + \beta y + c_x + d_X \\ y + c_y + d_y \end{pmatrix} \quad \text{[Equation 2]}$$

In Equation 2, x' indicates a deformation compensation parameter with respect to a length difference and y' indicates a deformation compensation parameter with respect to a warping degree. In addition, $(c_x, c_y)$ represents the center coordinates of the current texture block within the current view, $(d_x, d_y)$ represents coordinates within the reference view, which correspond to the center coordinates of the current texture block, (x, y) indicates coordinates of a pixel in the current texture block, which are represented on the basis of the center coordinates, and (x', y') indicates coordinates within the reference view, which correspond to (x, y). Since two cameras for photographing a multiview image are positioned on a horizontal line, it is possible to assume that $d_y$ is 0 and the y-coordinate is not changed. Accordingly, when Equation 2 is arranged with respect to the x-coordinate, the effect of the deformation compensation parameter information can be represented by Equation 3.

$$x' = \alpha x_i + \beta y_i + c_x + d_x \quad \text{[Equation 3]}$$

Here, a subscript i is used to identify a pixel in the current texture block. Coordinates of pixels within the reference view, which correspond to the current texture block, can be acquired using pixels in the current texture block and the deformation compensation parameter information through Equation 3.

A description will be given of an example of acquiring a virtual reference picture with reference to FIG. 5.

Figure 5:
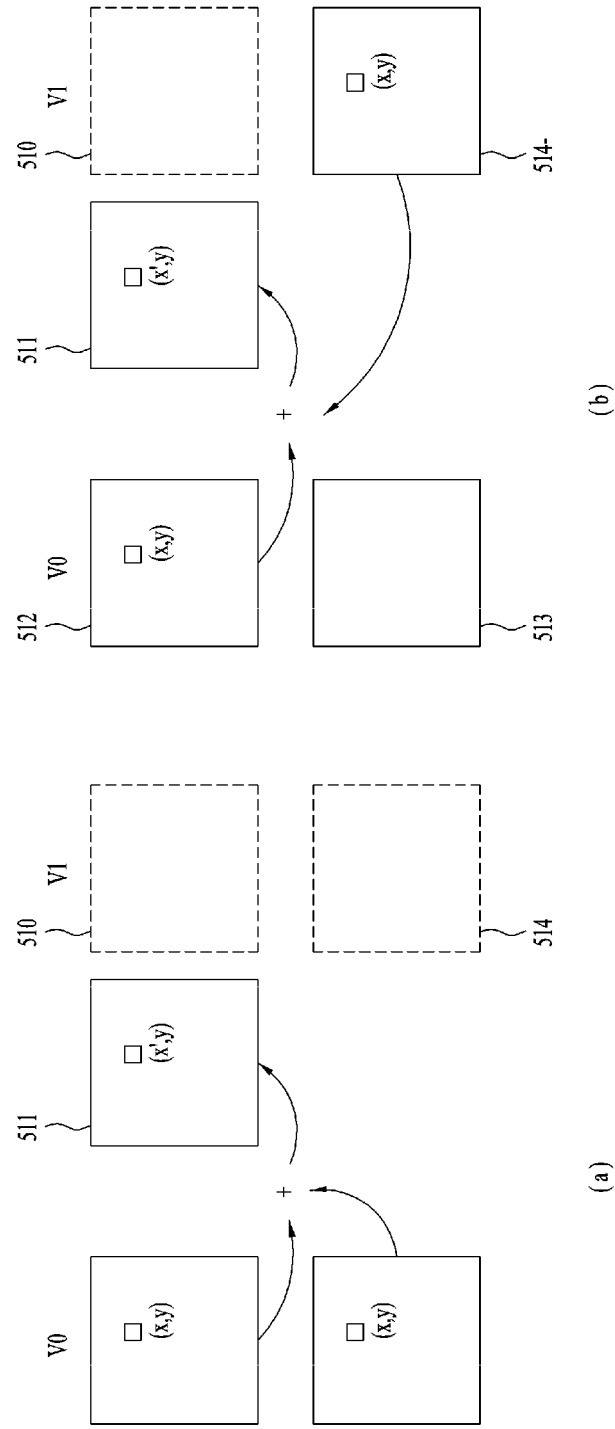
FIG. 5 illustrates examples of acquiring a virtual reference picture according to an embodiment to which the present invention is applied.

FIG. 5 illustrates examples of acquiring a virtual reference picture according to an embodiment of the present invention.

FIG. 5(a) shows an example of acquiring a virtual reference picture through forward synthesis. Forward synthesis can be used when decoding is performed in order of a texture picture and a depth picture. In FIG. 5(a), a reference view texture picture 512 and a reference view depth picture 513, indicated by solid lines, are pictures that have been decoded, a current view current texture picture 510 and a current view depth picture 514, which are indicated by dotted lines, are pictures that have not been decoded, and a virtual reference picture 511 is a picture for decoding the current view texture picture 510.

The virtual reference picture 511 through forward synthesis can be obtained using an inter-view motion vector acquired using a pixel value of the reference view texture picture 512 and a depth value of the reference view depth picture 513. That is, a pixel at (x, y) within the reference view current texture picture can correspond to a pixel value at (x+dv, y) within the virtual reference picture by using an inter-view motion vector dv which is acquired using a depth value at the same position (x, y) within the reference view depth picture.

FIG. 5(b) shows an example of acquiring a virtual reference picture through reverse synthesis. Reverse synthesis can be used when decoding is performed in order of a depth picture and a texture picture. In FIG. 5(b), the reference view texture picture 512, the reference view depth picture 513 and the current view depth picture 514, indicated by solid lines, are pictures that have been decoded, the current view texture picture indicated by a dotted line is a picture that has not been decoded, and the virtual reference picture 511 is a picture for decoding the current view texture picture 510.

The virtual reference picture 511 through reverse synthesis can be acquired using an inter-view motion vector obtained by using a pixel value of the reference view texture picture 512 and a depth value of the current view depth picture 514. That is, the pixel at (x, y) within the reference view current texture picture can correspond to a pixel value at (x+dv, y) within the virtual reference picture by using an inter-view motion vector dv acquired using a depth value at the same position (x, y) within the current view depth picture.

Disparity compensation prediction refers to a method of acquiring prediction values of the current texture block using a reference picture of a reference view. A description will be given of a deformation compensation method in view synthesis prediction and a deformation compensation method in disparity compensation prediction with reference to FIG. 6.

Figure 6:
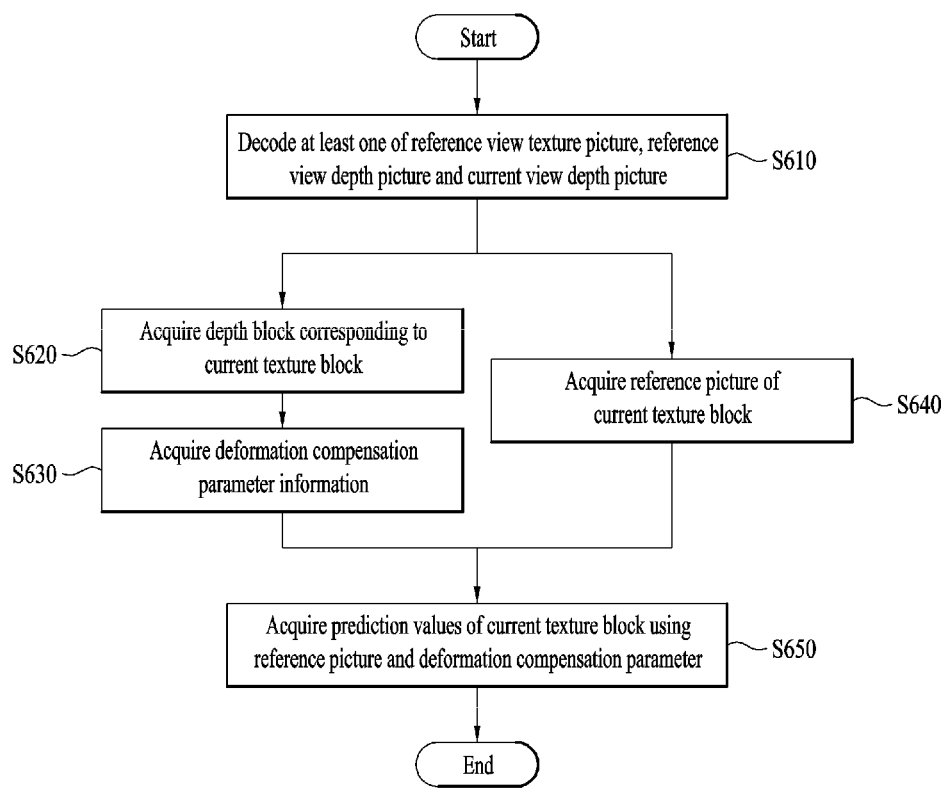
FIG. 6 is a flowchart illustrating an exemplary deformation compensation method in disparity compensation prediction according to an embodiment to which the present invention is applied.

FIG. 6 is a flowchart illustrating an exemplary deformation compensation method in disparity compensation prediction according to an embodiment of the present invention.

At least one of a reference view texture picture, a reference view depth picture and a current view depth picture may be decoded (S610). The reference view texture picture may be decoded prior to a current view texture as in step S410. Here, a decoded depth block may include one of a depth block of the reference view and a depth block of the current view. The reference view texture picture may be decoded through intra-prediction or inter-prediction without using a texture picture of a different view as a reference picture.

A depth block corresponding to the current texture block may be acquired (S620). As in step S420, the depth block corresponding to the current texture block may be a depth block at the same position as a current texture picture within a depth picture corresponding to the same view as a current picture and having the same POC as the current picture. Alternatively, the depth block corresponding to the current texture block may be a depth block disposed at a position considering an inter-view motion vector within a depth picture corresponding to a view different from the current picture and having the same POC as the current picture. For example, when the left upper point of the current texture picture is (px, py) and the inter-view motion vector is (dvx, dvy), the left upper point of the depth block corresponding to the current texture block at the reference view can be (px+dvx, pu+dvy). Alternatively, the y value of the inter-view motion vector may be ignored and (px+dvx, py) may be determined as the left upper point of the depth block corresponding to the current texture block.

Deformation compensation parameter information deform_value may be acquired (S630). The deformation compensation parameter information deform_value is information used to acquire the position of a block within the reference picture, which corresponds to the current texture block, for deformation compensation and may be acquired using at least one of deformation compensation application information deform_type, deformation compensation scale information deform_scale, deformation compensation application block information deform_max_depth, deformation compensation parameter index information deform_param_idx, deformation compensation reuse information and an inter-view disparity vector. An example of acquiring the deformation compensation application information and the deformation compensation scale information will be described later with reference to FIG. 7. In addition, an example of acquiring the deformation compensation application block information will be described later with reference to FIG. 8. Furthermore, acquisition of the deformation compensation reuse information and reuse of the deformation compensation parameter index information will be described later with reference to FIGS. 10 to 13.

The deformation compensation parameter information can be acquired using the deformation compensation application information, the deformation compensation scale information and the deformation compensation parameter index information through Equation 4 or 5.

deform_value=precision_value+deform_scale×(deform_param_idx−1)　　[Equation 4]

deform_value=deform_scale×(deform_param_idx−1)　　[Equation 5]

Equation 4 is used to acquire the deformation compensation parameter information when the deformation compensation application information is 1. In Equation 4, precision_value is a deformation compensation accuracy coefficient for adjusting deformation compensation accuracy. The deformation compensation accuracy coefficient can be set to one of 32, 8 and 4.

Equation 5 is used to acquire the deformation compensation parameter information when the deformation compensation application information is 2.

In Equations 4 and 5, the deformation compensation parameter index information can be acquired from a slice header. An example of obtaining the deformation compensation parameter index information will be described later with reference to FIG. 9.

A reference picture referred to by the current texture block may be acquired (S640). The reference picture referred to by the current texture block may be acquired using reference picture information refIdx of the current texture block or reference picture information of a neighboring block included in a bitstream.

Prediction values of the current texture block may be acquired using the reference picture and the deformation compensation parameter (S650). The position of a block within the reference block of the current texture block may be acquired and pixels values of the block within the reference block, which corresponds to the acquired position, may be obtained as the prediction values of the current texture block. The position of the block within the reference block of the current texture block may be acquired using Equations 1 and 2 described in step S450. When length difference deformation compensation is performed, the position of the block within the reference block, which corresponds to the current texture block, can be acquired using Equation 6.

$$x'=(deform\_value/precision\_value)\times(x-xc)+xc+dvx$$

$$y'=y+dvy \quad [\text{Equation 6}]$$

When warping deformation compensation is performed, the position of the block within the reference block, which corresponds to the current texture block, can be acquired using Equation 7.

$$x'=x+(deform\_value/precision\_value)\times(y-yc)+yc+dvy$$

$$y'=y+dvy \quad [\text{Equation 7}]$$

In Equations 6 and 7, deform_value is deformation coefficient information which can be obtained using the deformation compensation scale information and the deformation compensation parameter index information, (xc, yc) indicates the center coordinates of the current texture block, (x, y) indicates the coordinates of the current texture block, (x', y') represents coordinates of the block within the reference picture of the current texture block, and precision_value is a deformation compensation accuracy coefficient for adjusting deformation compensation accuracy. The deformation compensation accuracy coefficient can be obtained from a parameter set or a slice header.

A description will be given of an example of acquiring the deformation compensation application information and the deformation compensation scale information with reference to FIG. 7.

FIG. 7 illustrates an example of acquiring the deformation compensation application information and the deformation compensation scale information according to an embodiment of the present invention.

The deformation compensation application information and the deformation compensation scale information may be acquired from a slice header, as shown in FIG. 7. The deformation compensation application information can indicate whether to apply deformation compensation and which one of length difference deformation application and warping deformation compensation will be applied. The deformation compensation scale information can indicate a deformation compensation degree.

A description will be given of an example of acquiring the deformation compensation block information.

FIG. 8 illustrates an example of acquiring the deformation compensation block information according to an embodiment of the present invention.

The deformation compensation block information can be acquired from a sequence parameter set as shown in FIG. 8. The deformation compensation block information can indicate the size of a coding block to which deformation compensation is applied. For example, when the deformation compensation block information is 1, the deformation compensation block information can indicate that deformation compensation is applied to a coding unit and a prediction unit having a depth of 0 or 1. Accordingly, deformation compensation is not applied to coding units and prediction units having a depth of 2 or larger.

A description will be given of an example of acquiring the deformation compensation parameter index information with reference to FIG. 9.

FIG. 9 illustrates an example of acquiring the deformation compensation parameter index information according to an embodiment of the present invention.

The deformation compensation parameter index information deform_param_idx can be acquired on the basis of the prediction mode of the current texture block per coding unit or prediction unit. For example, the deformation compensation parameter index information can be acquired in the case of a prediction block coded according to inter-prediction that refers to one reference picture, as shown in FIG. 9. In addition, the deformation compensation parameter can be acquired only when the deformation compensation application information is 1 or 2 and thus deformation compensation is applied, as shown in Table 1.

TABLE 1

| deform_type | deform_param_idx |
|---|---|
| 0 | Not transmitted |
| 1 | 0, 1, 2 |
| 2 | 0, 1, 2 |

The deformation compensation parameter information may be acquired using deformation compensation parameter index information of a neighboring block, instead of the aforementioned method. A description will be given of a method for acquiring the deformation compensation parameter index information of the current texture block by reusing deformation compensation parameter index information of a neighboring block with reference to FIGS. 10 to 13.

Figure 10:
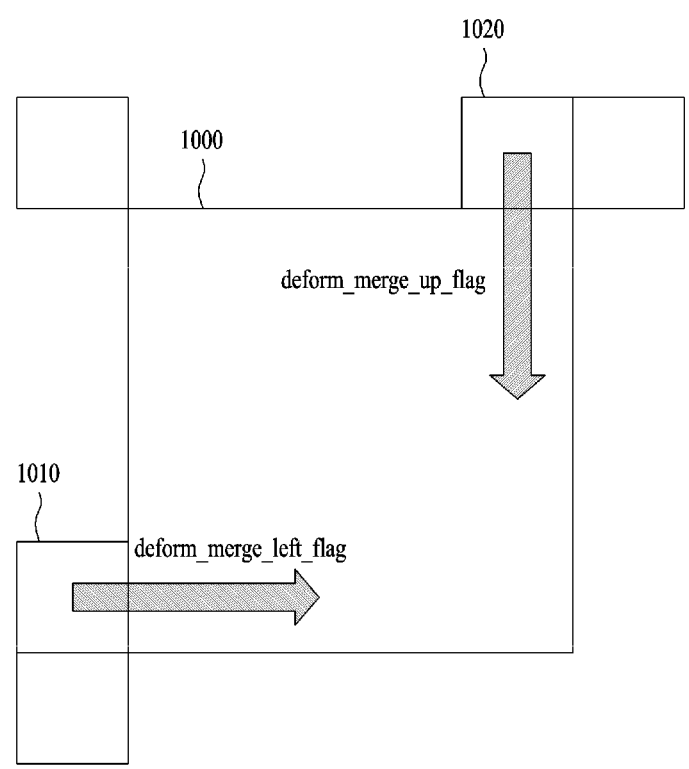
FIG. 10 illustrates an example of acquiring deformation compensation parameter index information of a current texture block by reusing deformation compensation parameter index information of a neighboring block according to an embodiment to which the present invention is applied.

1) Method 1 of Reusing Deformation Compensation Parameter Index Information of a Neighboring Block FIG. 10 illustrates an example of acquiring the deformation compensation parameter index information of the current texture block by reusing deformation compensation parameter index information of a neighboring block according to an embodiment of the present invention.

The deformation compensation parameter index information of the current texture block 1000 may be acquired using deformation compensation parameter index information of a left neighboring block 1010 and an upper neighboring block 1020 of the current texture block 1000. For example, when a deformation compensation merge left flag deform_merge_left_flag is set to 1, the deformation compensation parameter index information of the left neighboring block 1010 is allocated as the deformation compensation parameter index information of the current texture block 1000. When the deformation compensation merge left flag is set to 0, the deformation compensation parameter index information of the left neighboring block 1010 is not used. When the left neighboring block is not available since the left neighboring block adjoins the left boundary or is an intra block, the deformation compensation parameter index of the current texture block can be determined as 1. When deformation compensation merge upper flag deform_merge_up_flag is 1, the deformation compensation parameter index information of the upper neighboring block 1020 is allocated as the deformation compensation parameter index information of the current texture block 1000. When the deformation compensation merge upper flag is 0, the deformation compensation parameter index information of the upper neighboring block 1010 is not used. When the upper neighboring block is not available since the upper neighboring block adjoins the upper boundary or is an intra block, the deformation compensation parameter index of the current texture block can be determined as 1.

FIG. 11 illustrates an example of acquiring the deformation compensation merge left flag and the deformation compensation merge upper flag according to an embodiment of the present invention.

The deformation compensation merge left flag and the deformation compensation merge upper flag can be acquired per coding unit or prediction unit. The deformation compensation merge left flag may be acquired and then the deformation compensation merge upper flag may be obtained, or the deformation compensation merge upper flag may be acquired and then the deformation compensation merge left flag may be obtained.

For example, the deformation compensation merge left flag can be acquired using a POC of a reference picture of the current texture picture and the prediction mode of the current texture block, as shown in FIG. 11. When the deformation compensation merge left flag is 0, the deformation compensation merge upper flag can be acquired. When the deformation compensation merge upper flag is 0, deformation compensation parameter index derivation information deform_param_idx2 can be obtained. The deformation compensation parameter index derivation information indicates a case in which the deformation compensation index information of the current texture block differs from the deformation compensation parameter index information of the neighboring block. Accordingly, the deformation compensation index information of the current texture block can be derived as a value different from the deformation compensation index information of the neighboring block by using the deformation compensation parameter index derivation information A description will be given of another example of acquiring the deformation compensation parameter index information of the current texture block by reusing deformation compensation parameter index information of a neighboring block with reference to FIGS. 12 and 13.

Figure 12:
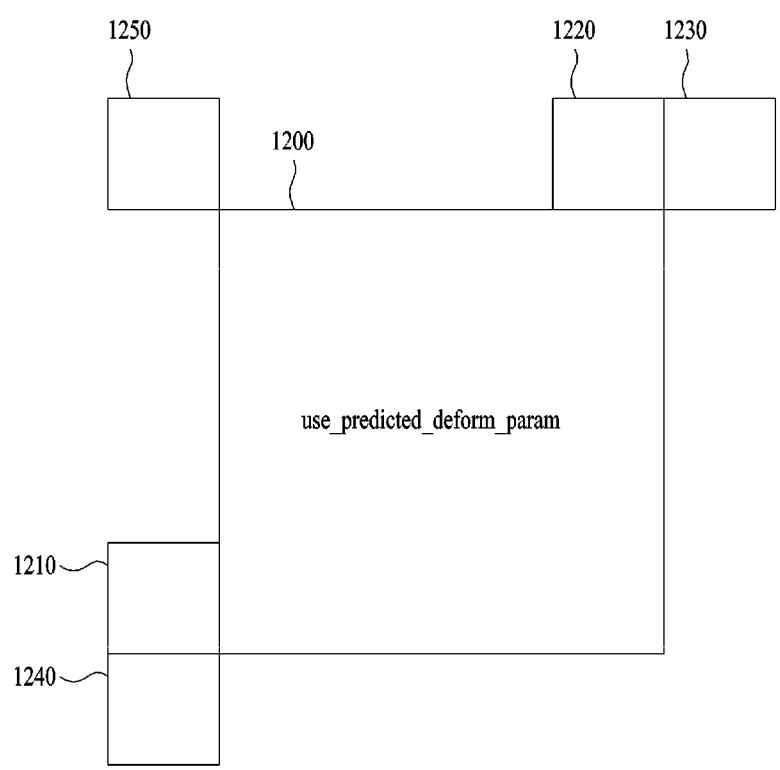
FIG. 12 illustrates an example of acquiring deformation compensation parameter index information of a current texture block by reusing deformation compensation parameter index information of a neighboring block according to an embodiment to which the present invention is applied.

2) Method 2 of Reusing Deformation Compensation Parameter Index Information of a Neighboring Block FIG. 12 illustrates an example of acquiring the deformation compensation parameter index information of the current texture block by reusing deformation compensation parameter index information of a neighboring block according to an embodiment of the present invention.

The deformation compensation parameter index information of the current texture block 1200 can be acquired using deformation compensation reuse information use_predicted_deform_param and the deformation compensation parameter index information of the neighboring block. At least one of a left neighboring block 1210, an upper neighboring block 1220, a right upper neighboring block 1230, a left lower neighboring block 1240 and a left upper neighboring block 1250 may be used as the neighboring block. For example, when the deformation compensation reuse information is 1, deformation compensation parameter index information used in the neighboring blocks 1210, 1220, 1230, 1240 and 1250 can be acquired. Then, deformation compensation parameter index information used for one neighboring block is allocated as the deformation compensation parameter index information of the current texture block 1200 according to a predetermined condition.

The predetermined condition is described. First of all, deformation compensation parameter index information, which is not 1, is acquired from neighboring blocks. When one neighboring block has deformation compensation parameter index information, which is not 1, the deformation compensation parameter index information of the neighboring block is allocated as the deformation compensation parameter index information of the current texture block. When a plurality of neighboring blocks has deformation compensation parameter index information which is not 1, however, the deformation compensation parameter index information of the current texture block can be acquired according to predetermined priority. For example, when the left neighboring block 1210 and the upper neighboring block 1220 have deformation compensation parameter index information which is not 1 and the left neighboring block 1210 has higher priority than the upper neighboring block 1220, the deformation compensation parameter index information of the left neighboring block is allocated as the deformation compensation parameter index information of the current texture block. Alternatively, the median of deformation compensation parameter index information, which is not 1, acquired from neighboring blocks may be allocated as the deformation compensation parameter index information of the current texture block.

FIG. 13 illustrates an example of acquiring the deformation compensation reuse information according to an embodiment of the present invention.

The deformation compensation reuse information can be acquired per coding unit or prediction unit. For example, the deformation compensation reuse information can be obtained using POC of the reference picture of the current texture block and the prediction mode of the current texture block. When the deformation compensation reuse information is 0, the deformation compensation parameter index derivation information deform_param_idx2 can be obtained. The deformation compensation parameter index derivation information indicates a case in which the deformation compensation index information of the current texture block differs from the deformation compensation parameter index information of the neighboring block. Accordingly, the deformation compensation index information of the current texture block can be derived as a value different from the deformation compensation index information of the neighboring block by using the deformation compensation parameter index derivation information As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission over the Internet). In addition, a bitstream generated according to the encoding method may be stored in a computer-readable recording medium or transmitted using a wired/wireless communication network.

INDUSTRIAL APPLICABILITY

The present invention can be used to code video signals.

The invention claimed is:

1. A method for processing a video signal by a video decoder, comprising:
    acquiring, by the video decoder, deformation compensation application information, deformation compensation scale information, and deformation compensation parameter index information from the video signal;
    acquiring, by the video decoder, deformation compensation parameter information of a current texture block,
    wherein the deformation compensation parameter information is used to acquire a position of a block corresponding to the current texture block within a reference picture of the current texture block,
    wherein the deformation compensation parameter information is obtained using deform_value=precision_value+deform_scale×(deform_param_idx−1) when the deformation compensation application information is 1,
    wherein the deformation compensation parameter information is obtained using deform_value=deform_scale×(deform_param_idx−1) when the deformation compensation application information is 2, and
    wherein deform_value is the deformation compensation parameter information, precision_value is set to one of 32, 8, 4, deform_scale is the deformation compensation scale information, and deform_param_idx is the deformation compensation parameter index information;
    acquiring, by the video decoder, the corresponding block within the reference picture using the deformation compensation parameter information,
    wherein a position of the corresponding block within the reference picture is acquired using (deform_value/precision_value); and
    acquiring, by the video decoder, pixels values of the corresponding block within the reference picture as prediction values of the current texture block.

2. The method according to claim 1, further comprising:
    acquiring, by the video decoder, deformation compensation block information indicating a size of a coding block to which deformation compensation is applied; and determining, by the video decoder, whether deformation compensation is applied to the current texture block using the deformation compensation block information.

3. A video decoder for processing a video signal, comprising:
an entropy decoding unit configured to acquire deformation compensation application information, deformation compensation scale information, and deformation compensation parameter index information from the video signal;
an inter-prediction unit configured to;
acquire deformation compensation parameter information of a current texture block,
wherein the deformation compensation parameter information is used to acquire a position of a block corresponding to the current texture block within a reference picture of the current texture block,
wherein the deformation compensation parameter information is obtained using deform_value=precision_value+deform_scale×(deform_param_idx−1) when the deformation compensation application information is 1,
wherein the deformation compensation parameter information is obtained using deform_value=deform_scale×(deform_param_idx−1) when the deformation compensation application information is 2, and wherein deform_value indicates the deformation compensation parameter information, precision_value is set to one of 32, 8, 4, deform scale indicates the deformation compensation scale information, and deform_param_idx indicates the deformation compensation parameter index information,
acquire the corresponding block within the reference picture using the deformation compensation parameter,
wherein a position of the corresponding block within the reference picture is acquired using (deform_value/precision_value), and
acquire pixels values of the corresponding block within the reference picture as prediction values of the current texture block.

4. The video decoder according to claim 3, wherein the inter-prediction unit acquires deformation compensation block information indicating a size of a coding block to which deformation compensation is applied, and determines whether deformation compensation is applied to the current texture block using the deformation compensation block information.

* * * * *